April 14, 1953     E. E. GILBERT ET AL     2,635,118
PREPARATION OF DI- AND TRICHLOROACETONES
Filed May 12, 1949
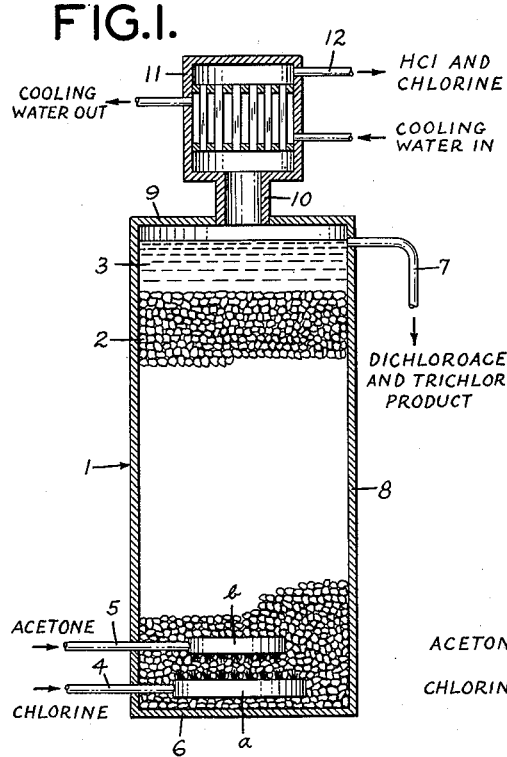
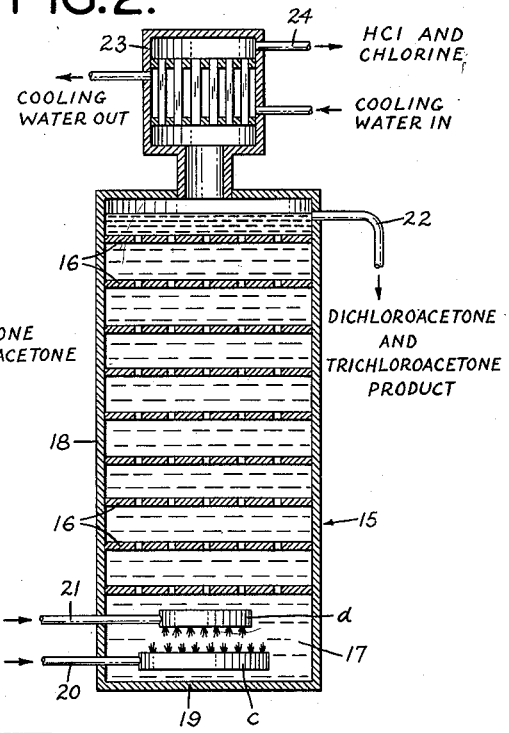
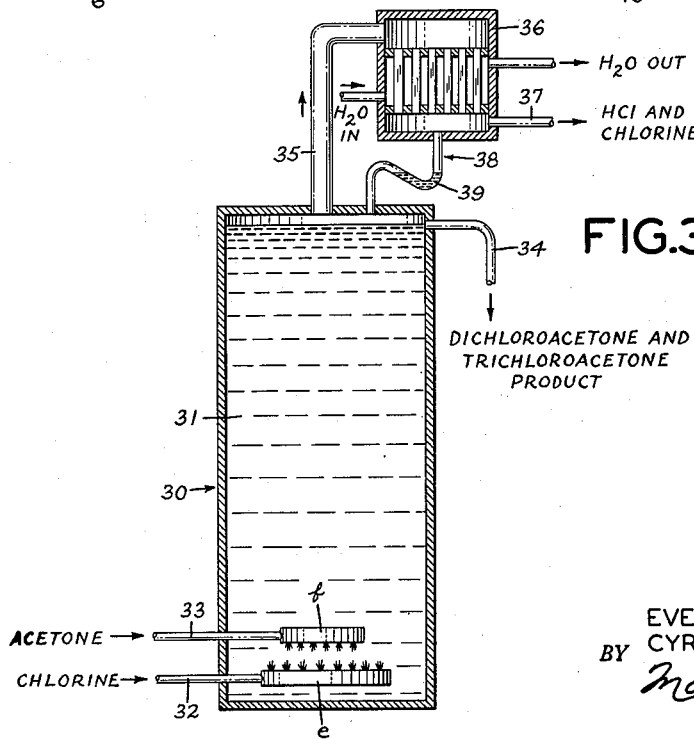
INVENTORS.
EVERETT E. GILBERT
BY CYRIL WOOLF
*Max Gelden*
ATTORNEY.

Patented Apr. 14, 1953

2,635,118

UNITED STATES PATENT OFFICE 2,635,118

PREPARATION OF DI- AND TRICHLORO-ACETONES

Everett E. Gilbert, New York, and Cyril Woolf, Long Island City, N. Y., assignors to Allied Chemical & Dye Corporation, New York, N. Y., a corporation of New York Application May 12, 1949, Serial No. 92,773

7 Claims. (Cl. 260—593)

This invention relates to the production of polychloroacetones and is particularly concerned with the conversion of acetone to di- or trichloroacetones, especially the latter.

It has been known to prepare polychloroacetones by chlorinating acetone, generally employing batch procedure. However, the major difficulty heretofore encountered in this process has been the intermolecular condensation of acetone occurring as result of the presence of high concentrations of dissolved HCl produced in the reaction, such intermolecular condensation bringing about reduction in yield of desired chloroacetone products. Various proposals have been made to remedy this defect but to our knowledge none of the prior attempts in this direction has been found completely satisfactory.

Thus, it has been proposed to eliminate HCl by chlorinating acetone in the presence of water and agents capable of binding HCl such as calcium carbonate, but preparation particularly of di- and trichloroacetones by this procedure is slow and unsatisfactory and also requires further treatment of the product for purification thereof when agents such as calcium carbonate are employed. Chlorination of acetone in concentrated calcium chloride solutions has also been attempted, presumably because of a lower solubility of HCl in such solutions. However, the latter method again poses the problem of freeing the product from its calcium chloride impurity. Vapor phase chlorination of acetone to polychloroacetones has also proven unsuccessful because of extensive decomposition due to the difficulty in controlling temperature by this procedure.

One object of the invention is to prepare dichloroacetones and trichloroacetones. Another object of the invention is to produce di- and trichloroacetones, particularly trichloroacetones, in high yields by chlorination of acetone. A further aim of the invention is to provide a continuous process for commercial chlorination of acetone to di- and trichloroacetones, especially 1,1,3-trichloroacetone, in high yields and under economical operating conditions utilizing standard chlorinating equipment.

In accordance with the invention, we have found that chloroacetones containing from 2 to 3 chlorine atoms, i. e. dichloroacetones and trichloroacetones, can be smoothly prepared in excellent yield and with high rate of production involving almost complete suppression of intermolecular condensation of acetone, by separately and simultaneously introducing chlorine and acetone in a ratio of 2 to 3.5 mols of chlorine per mol of acetone into a body of the liquid chloroacetone reaction product comprising a dichloroacetone and/or a trichloroacetone at a temperature between 10° C. and the boiling temperature of the chloroacetone reaction product. Practice of the invention results in production of dichloroacetone, trichloroacetone or mixtures thereof, and is particularly advantageous for production of trichloroacetones, especially 1,1,3-trichloroacetone. The products of the invention are of importance as chemical intermediates in the production of fluorine derivatives, insecticides and weed killers.

Production of the sought-for chloroacetone products in high yield with good production rates and negligible formation of intermolecular condensation products of acetone is brought about in accordance with the invention by a combination of factors. In the first place, the acetone upon entering the reaction mass and meeting a high concentration of chlorine (between 2 and 3.5 mols per mol of acetone) reacts very rapidly with the chlorine to yield di- and trichloroacetones so that the time during which free acetone is present after entering the reaction mass is sufficiently short to preclude intermolecular condensation of the free acetone by reason of the presence of the dissolved HCl formed in the reaction. Further, by introducing the chlorine and acetone separately and simultaneously, preferably near the base of the reactor, into a relatively large body of liquid reaction product, the chlorinacetone reaction is effected rapidly in liquid phase in a vicinity close to the point of entrance of the reactants into the reactor, allowing very little, if any, free acetone to become dispersed throughout the body of reaction liquid and enter into contact with HCl. Reaction of the chlorine and acetone in liquid phase employing a relatively large body of liquid reaction product as reaction medium also enables maintenance of good temperature control by enabling rapid dissipation of the heat of reaction through the reaction liquid while at the same time permitting use of high reaction temperatures resulting in high chlorination rates. It is accordingly noted that the utilization of high chlorine concentration, as hereinafter more fully described, separate and simultaneous flow of chlorine and acetone, and employment of a body of liquid chloroacetone reaction product as reaction medium constitute important features of the invention.

A factor in successful practice of the invention is the positioning of the points of introduction of the chlorine and acetone into the liquid chloroacetone reaction mixture. The chlorine and acetone are preferably introduced into the reaction mass at points as closely adjacent as possible under the particular chlorination conditions involved, provided the respective inlets are always separated by a continuous body of liquid reaction product. Observance of these conditions promotes rapid consumption of free acetone as it enters the reaction medium by the high concentration of chlorine in the immediate vicinity. While the chlorine inlet may be located above the acetone inlet, usually the chlorine is introduced at a level not substantially above the acetone. From experience we have found that good results are obtained if the acetone is introduced into the reaction medium at a level somewhat above that of the chlorine, or if the two reactants are introduced at substantially the same level. In this manner the acetone, on entering the reaction zone, is immediately enveloped by a high concentration of dissolved chlorine and is forthwith chlorinated.

The initial product of reaction between the chlorine and acetone is, we believe, monochloroacetone. Once the acetone is converted to its monochloro derivative, there is no longer any danger of intermolecular condensation, since monochloroacetone, unlike acetone itself, is inert to the condensing action of HCl, and the monochloro derivative is then easily converted on further chlorination to the sought-for di- or trichloroacetone. However, it is necessary that there be sufficient reaction medium above the reactant inlets under the prevailing conditions to allow enough time of contact between the chlorine and initially formed monochloroacetone so that chlorination of the organic reactant proceeds to the di- or trichloro stage. Accordingly, in preferred operation, the chlorine and acetone are introduced into the reactor, usually in the form of a tower, under conditions to provide sufficient reaction volume between the reactant inlets and the product removal position near the top of the reactor, particularly as regards continuous operation, so as to withdraw a di- or trichloroacetone product substantially free from monochloroacetone.

Employing our preferred embodiment wherein chlorine is introduced at a level not substantially above the acetone, we have noted good results are achieved when the product is withdrawn at a level a distance above the acetone inlet of at least 4 times the diameter of a circle having an area equal to the cross sectional area of the body of reaction liquid. While a reactor fulfilling such requirements with respect to volume of reaction medium above the reactant inlets may be provided wherein such inlets are positioned, for example, in the center of the reactor, leaving a large free volume of reaction fluid below as well as above these inlets, since the body of liquid medium below the reactant inlets serves no useful purpose, it is preferred to introduce the chlorine and acetone near the base of the reactor, in which case substantially the entire body of liquid reaction product into which the reactants pass functions as active reaction medium for the chlorination reaction.

Figures 1, 2 and 3 of the accompanying drawing are cross-sectional views of three different types of reactors which may be used in carrying out the process of the invention.

Referring to Fig. 1 of the drawing relating to a preferred form of apparatus utilized in the process of the invention, a reactor 1 is provided in the form of a column or tower. The reactor column or tower is packed with any form of inert distributing bodies 2, e. g. glass helices or ceramic bodies, to provide more intimate contact between the gaseous reactants and the liquid phase reaction medium, and the reactor is filled with a relatively large body of liquid di- or trichloroacetone reaction product 3. Chlorine and acetone inlet pipes 4 and 5, respectively, are positioned closely adjacent each other near the base 6 of the reactor, the acetone inlet pipe being positioned somewhat above the chlorine pipe. In commercial operation, for example, utilizing a reactor of 25 cubic feet capacity, the distance between the acetone and chlorine inlets may be about 6 inches. Chlorine and acetone pipes 4 and 5 are connected to dispersion plates $a$ and $b$ respectively within the reactor, plate $a$ containing holes or gas outlets in its upper surface and plate $b$ containing holes in its lower surface. The surface area of chlorine dispersion plate $a$ is greater than that of acetone dispersion plate $b$ so that a high concentration of chlorine emanating from plate $a$ completely surrounds and envelops the acetone flowing from plate $b$. A take-off pipe 7 is positioned in the upper portion of side wall 8 near the top of the tower as an outlet for di- and trichloroacetone reaction product removed from the surface of the reaction medium. Connected to the top 9 of the reactor by means of pipe 10, is a reflux condenser 11 containing pipe 12 for removal of HCl and residual chlorine. Reactor cooling means (not shown) in the form of internal cooling coils or an external water jacket may be employed if necessary or desirable.

Figure 2 illustrates another form of apparatus which may be employed in the invention process. In this modification the reactor tower 15 contains a series of perforated plates 16 and the reactor is filled with a body of liquid chloroacetone reaction product 17. In the lower portion of side wall 18 of the reactor and near bottom 19, are positioned closely adjacent each other chlorine and acetone inlets 20 and 21, respectively. Pipes 20 and 21 are directly connected to chlorine and acetone dispersion plates $c$ and $d$, respectively, of a type similar to plates $a$ and $b$ in Figure 1. A product exit pipe 22 is located near the top of the tower, with reflux condenser 23 containing HCl and chlorine exit pipe 24 positioned in the top of the reactor.

In still another modification of apparatus which may be employed in the instant process, as represented in Figure 3, a reactor 30 containing neither packing nor perforated plates is filled with a body of liquid chloroacetone reaction product 31. Located closely adjacent each other in the lower portion of the reactor near its base are provided chlorine and acetone inlet pipes 32 and 33, each respectively connected to chlorine and acetone dispersion plates $e$ and $f$ within the reactor. A liquid product removal pipe 34 is positioned near the top of the reactor. For withdrawal of HCl and residual chlorine is provided in the top of the reactor gas exit pipe 35 connected to reflux condenser 36. Pipe 37 serves as an outlet for the cooled effluent HCl and chlorine from the condenser, with pipe 38 containing liquid trap 39 leading from the bottom of the condenser to the top of the reactor also provided for return of any liquid chloroacetones to the reaction zone. While the introduction of the reactants, e. g. chlorine, into the reactor and the bubbling of the HCl gas formed in the reaction may provide sufficient agitation to maintain the homogeneity of the reaction mixture, if desired, an agitator (not shown) may be employed to maintain a uniform reaction mixture.

While in the embodiments shown in the drawing, the chlorine and acetone are introduced into the reaction liquid by means of a dispersion plate containing a plurality of openings, the reactants may be fed into the reaction mixture by means of simple inlet pipes without the use of dispersion plates provided the reaction mass is kept well agitated.

Acetone may be introduced into the reactor in either liquid or vapor form. Upon entering the reaction mass, the acetone, to a great extent, dissolves in the reaction medium near the point of introduction of the acetone, and is almost immediately transformed into chlorinated compounds before it has a chance to disperse in the reaction medium. The concentration of acetone is at a maximum in the immediate vicinity of reaction closely adjacent to its point of entrance into the reaction mixture. However, the acetone concentration in the bulk of the reaction medium outside the vicinity of reaction, e. g. from the middle to the top of the reactor, is exceedingly small and affords substantially no opportunity or intermolecular condensation of the acetone reactant by means of the HCl present.

A high concentration of chlorine as compared to incoming acetone is always present in the reaction mass, particularly in the locality of acetone introduction, the quantity of chlorine being at least that theoretically required for reaction with acetone to produce the di- and trichloroacetone products. Thus, if it is desired to prepare dichloroacetones, at least 2 mols of chlorine should be simultaneously introduced for each mol of acetone, and if it is desired to prepare trichloroacetones the ratio of incoming chlorine to entering acetone should be about 3 mols of chlorine per mol of acetone, the use of up to 3.5 mols of chlorine per mol of acetone insuring more complete reaction to the trichlor stage. Ordinarily, a slight excess of chlorine over the theoretical amount is employed. If the preparation of mixtures of di- and trichloroacetones is desirable, between 2 and 3 mols of chlorine per mol of acetone is utilized, approximately equimolar mixtures of the two products being formed at a ratio of 2.5 mols of chlorine per mol of acetone. When the quantity of chlorine introduced ranges between 2 and 2.5 mols per mol of acetone, the mixture of di- and trichloroacetones which may be formed predominates in the dichlor compound while the trichlor derivative is the major compound of such mixtures if a proportion of between 2.5 and 3 mols of chlorine per mol of acetone is applied. As already noted, introduction of acetone into such large concentrations of chlorine is important in effecting immediate reaction, leaving substantially no free acetone for intermolecular condensation in the presence of the HCl produced in the reaction. The chlorine concentration in the reaction mass is at a maximum in the locality near its entrance into the reaction zone and is smaller in the remaining bulk of reaction medium.

The body of liquid chloracetone reaction product into which the chlorine and acetone are fed may be dichloroacetone, trichloroacetone, or mixtures thereof, depending on the product being produced as determined by the ratio of chlorine and acetone undergoing reaction. The temperature of reaction is such that the chloroacetone reaction medium and the corresponding chloroacetone reaction product being continuously produced are always in the liquid phase, and hence reaction temperature is maintained below the boiling point of the chloroacetone reaction product at the particular pressure of the reaction. However, we prefer to carry out the instant process at a temperature of 30°–100° C., and for most desirable results as regards especially preparation of trichloroacetone, particularly 1,1,3-trichloroacetone, a temperature of 70°–80° C. is employed. The body of liquid phase chloroacetone reaction product utilized as reaction medium aids in the control of temperature by enabling rapid dissipation of the heat of reaction. If necessary, additional cooling may be effected by water cooling through coils placed within the reactor or by passage of water through an external jacket of the reactor. By varying reaction temperature and rate of feed of reactants, as well as ratio of chlorine to acetone introduced, the composition of the product with respect to relative proportions of di- and trichloroacetones may likewise be varied.

The pressure maintained within the reactor is preferably about atmospheric, although such pressure may be above or below atmospheric. The chlorine and acetone reactants are under sufficient pressure above that in the reactor to enable these materials to be forced into the reaction liquid.

Under the conditions of reaction noted above, the concentration of HCl present in the di- and trichloroacetone reaction medium and resulting from the chlorination is very low, particularly in the vicinity of reaction between the chlorine and acetone near their points of introduction into the reaction mass at the bottom of the reactor. Low concentration of HCl, especially near the point of entrance of acetone into the reaction zone, is important in preventing intermolecular condensation of acetone. Near the bottom of the reactor where the chlorination of acetone is taking place, the concentration of HCl is a minimum and increases from the bottom to the upper surface of the reaction medium. Generally, for example, the solubility of HCl in the reaction medium at 70°–80° C. is not substantially greater than 0.1 gram per 100 grams of solution.

The product, dichloroacetone, trichloroacetone or mixtures thereof, may be continuously or intermittently removed from the surface of the chloroacetone reaction liquid by any suitable means such as through a side-arm, tube or upper take-off pipe at the top of the reactor, as noted in the drawing. The various di- and trichloroacetones obtained as product may be separated from the reaction mixture by distillation, if desired, or the crude reaction product may be used directly in subsequent reactions. Yields of the dichloroacetones and trichloroacetones produced in accordance with the invention often range as high as 90–97% of theoretical based on acetone input.

As noted in the drawing, the reactor is provided with a reflux condenser for cooling reaction vapors and permitting exit of HCl and any excess chlorine from the reactor while returning chloroacetones to the reaction mass. The reactor exit gases are passed through a conventional water scrubber to dissolve HCl and the effluent chlorine may then be dried and recycled in the instant process.

Suitable materials of construction for the reactor include "Haveg," glass and Monel metal.

While the process of this invention is best adapted to continuous operation, the principles of the invention may likewise be applied to batch procedure.

The following examples are illustrative of the invention, all quantities being expressed in parts by weight:

*Example 1.*—A Pyrex tubular reactor tower of 2 inches inside diameter is packed with ¼ inch glass helices and filled to a depth of about 15 inches with a charge of about 1150 parts of trichloroacetones to function as reaction medium. During a period of about 5¼ hours, 149 parts of acetone are vaporized and forced by nitrogen through a capillary to the base of the tower and into the body of liquid trichloroacetones therein. In this same period 547 parts of chlorine are simultaneously and separately introduced into the reaction liquid through a sintered glass dispersion plate near the base of the tower. The ratio of chlorine to acetone being continuously fed into the reaction mixture is about 3.0 mols of chlorine per mol of acetone. A reaction temperature of 80° C. is maintained using an external water bath at about 65° C. Liquid trichloroacetones as product are continuously removed from the reactor through a side-arm at the top of the tower, 396 parts of trichloroacetones being collected in the 5¼ hour period. Reactor exit vapors containing HCl and excess chlorine passing the reflux condenser are scrubbed with water, and effluent chlorine from the water scrubber is collected. The yield of trichloroacetones obtained amounts to about 95% of theory based on acetone.

*Example 2.*—About 1125 parts of trichloroacetones are charged to the reactor tower described in Example 1, filling the tower to a depth of 15 inches. During a period of 45 hours, 1160 parts of acetone are vaporized and continuously forced by nitrogen to the bottom of the tower through a capillary tube. In the same period, 4080 parts of chlorine are simultaneously and continuously fed into the reaction mixture near the base of the tower, amounting to a proportion of about 2.9 mols of chlorine per mol of acetone being continuously introduced into the reaction mass. A reaction temperature of about 80° C. is maintained by external cooling with water at 65° C. Practically no chlorine remains unreacted. Liquid product comprising substantially a mixture of 1,1,3- and 1,1,1-trichloroacetones, predominantly the former, together with some dichloroacetones is continuously withdrawn from the reaction zone. At the end of the reaction period, the liquid product collected contains about 3040 parts of crude trichloroacetones amounting to a yield of about 94% trichloracetones based on acetone input.

*Example 3.*—About 1050 parts of a mixture of di- and trichloroacetones are fed into the reactor described in Example 1. Acetone at the rate of 116 parts per hour and chlorine at the rate of 340 parts per hour, corresponding to 2.4 mols of chlorine per mol of acetone, are separately and simultaneously fed near the base of the reactor into the liquid reaction medium maintained at a temperature of about 90° C. Substantially all of the chlorine reacts, the exit HCl passing the reflux condenser being absorbed in water. Liquid reaction product comprising essentially a mixture of dichloroacetones and trichloroacetones containing about 40% trichloroacetones is continuously removed from the top of the tower at a rate of about 280 parts per hour. Yield of di- and trichloroacetones based on acetone input is 97%.

*Example 4.*—A chlorinating tower of about 16 cubic feet capacity is filled with ceramic packing (¾ inch mesh) and provided with a reflux condenser, separate base inlet pipes spaced about 6 inches apart for introduction of acetone and chlorine, and upper take-off pipe for removal of liquid product. About 5600 parts of liquid trichloroacetones are charged into the tower. About 4540 parts of acetone are then fed into the base of the reactor at a rate of about 190 parts per hour while simultaneously feeding through a separate inlet 16,600 parts of chlorine at the rate of about 690 parts per hour, corresponding to a rate of feed of about 3 mols of chlorine per mol of acetone. The liquid trichloroacetone reaction mass is maintained at about 70°–80° C. during the reaction period by circulating water through a jacket in the reactor wall. A total of about 12,230 parts of trichloroacetones are removed continuously from the upper liquid level of the reaction mass through the upper take-off pipe at a rate of 510 parts per hour, and the cooled exit gas comprising essentially HCl and excess chlorine, after passage through the reflux condenser, is conveyed to a water scrubbing tower for HCl absorption, the effluent chlorine being dried and recovered. The yield of trichloroacetones amounts to about 97% of theory based on acetone.

Since various modifications in the invention may be made without departing from the spirit thereof, the invention is to be taken as limited only by the scope of the appended claims.

We claim:

1. A process for preparing chloroacetones containing from 2 to 3 chlorine atoms which comprises separately and simultaneously dispersing streams of chlorine and acetone in a ratio of 2 to 3.5 mols of chlorine per mol of acetone into a vapor-to-liquid contacting system containing a substantial depth of liquid chloroacetone reaction product maintained at a temperature between 30 and 100° C. and comprising at least one compound selected from the group consisting of dichloroacetone and trichloroacetone, said streams of chlorine and acetone being dispersed from closely adjacent positions immersed in said liquid reaction product and separated by a continuous body thereof, the chlorine being introduced at such a rate that it bubbles up through the depth of the liquid, withdrawing excess chlorine together with hydrogen chloride above the liquid, and withdrawing the increment in said chloroacetone product at a point at which chlorination of the incoming acetone has proceeded at least to the dichloro stage.

2. A process for preparing chloroacetones containing from 2 to 3 chlorine atoms which comprises separately and simultaneously dispersing streams of chlorine and acetone in a ratio of 2 to 3.5 mols of chlorine per mol of acetone into a vertically elongated reactor substantially filled with liquid chloroacetone product maintained at a temperature between 30 and 100° C. and comprising at least one compound selected from the group consisting of dichloroacetone and trichloroacetone, said streams of chlorine and acetone being dispersed from closely adjacent positions near the base of the reactor and immersed in said liquid reaction product and separated by a continuous body thereof, the chlorine being introduced at such a rate that it bubbles up through the depth of the liquid, withdrawing excess chlorine together with hydrogen chloride above the liquid, and withdrawing the increment in said chloroacetone product at a point substantially above the inlet zone of the reactants, where chlorination of the incoming acetone has proceeded at least to the dichloro stage.

3. A process for preparing chloroacetones containing from 2 to 3 chlorine atoms by an essentially liquid phase reaction which comprises separately and simultaneously dispersing streams of chlorine and acetone in a ratio of 2 to 3.5 mols of chlorine per mol of acetone into a body of liquid chloroacetone reaction product comprising at least one compound selected from the group consisting of dichloroacetone and trichloroacetone at 30 to 100° C., the chlorine being introduced at substantially the same level as the acetone, both reactants being dispersed from closely adjacent positions immersed in said body of liquid product and separated by a narrow continuous zone thereof, the chlorine being introduced at such a rate that it bubbles up through the depth of the liquid, withdrawing excess chlorine together with hydrogen chloride above the liquid, and withdrawing the increment in said chloroacetone product at a level a distance above the acetone inlet of at least 4 times the diameter of a circle having an area equal to the cross sectional area of said body of liquid.

4. A continuous process for preparing trichloroacetones by an essentially liquid phase reaction which comprises separately and simultaneously dispersing streams of chlorine and acetone in a ratio of about 3 mols of chlorine per mol of acetone from closely adjacent positions near the base of and inside of a vertically elongated gas-to-liquid contacting reactor substantially filled with liquid trichloroacetone at 30 to 100° C., the reactant inlet positions being separated by a continuous body of the liquid trichloroacetone product, the chlorine being introduced at such a rate that it bubbles up through the depth of the liquid, withdrawing excess chlorine together with hydrogen chloride above the liquid, and continuously removing near the top of the reactor a mixture containing essentially 1,1,3- and 1,1,1-trichloroacetone, predominantly the former, as product.

5. A continuous process for preparing trichloroacetones by an essentially liquid phase reaction which comprises separately and simultaneously dispersing streams of chlorine and acetone in a proportion of about 3 mols of chlorine per mol of acetone from closely adjacent reactant inlets situated near the base of and inside of a packed tower substantially filled with liquid trichloroacetone at 70–80° C., said reactant inlets being separated by a continuous body of trichloroacetone, the chlorine being introduced at such a rate that it bubbles up through the depth of the liquid, withdrawing excess chlorine together with hydrogen chloride above the liquid, and continuously removing a mixture of trichloroacetones, predominantly 1,1,3-trichloroacetone, as product near the top of the reactor at a level a distance above the acetone inlet of at least 4 times the diameter of a circle having an area equal to the cross sectional area of said reactor.

6. A continuous process for preparing trichloroacetones by an essentially liquid phase reaction which comprises separately and simultaneously dispersing a stream of acetone and a stream of fine bubbles of chlorine in a proportion of about 3 mols of chlorine per mol of acetone near the base of an inside of a packed reactor substantially filled with liquid trichloroacetone at 70–80° C., the reactants being introduced from positions which are at substantially the same level, closely adjacent, and separated by a continuous body of liquid trichloroacetone, the chlorine being introduced at such a rate that it bubbles up through the depth of the liquid, withdrawing excess chlorine together with hydrogen chloride above the liquid, and continuously removing a mixture of trichloroacetones, predominantly 1,1,3-trichloroacetone, as product near the top of the reactor at a level a distance above the acetone inlet of at least 4 times the diameter of a circle having an area equal to the cross sectional area of said reactor.

7. A continuous process for preparing trichloroacetone by an essentially liquid phase reaction which comprises separately and simultaneously introducing chlorine and acetone in the proportion of about 2 mols of chlorine per mol of acetone near the base of a packed reactor substantially filled with liquid trichloroacetone at 70–80° C., wherein said chlorine and acetone are dispersed in the reaction mixture in finely divided opposed streams, the chlorine being introduced at a level just below that of the acetone and closely adjacent thereto and under conditions such that said chlorine surrounds and envelops said acetone and the chlorination thereof is effected at least to the monochloro state substantially at the point of introduction of the actone into the reaction mixture whereby said acetone is chlorinated so rapidly as to substantially prevent intermolecular condensation of said acetone by the HCl produced in the reaction, with completion of chlorination to said trichloroacetones taking place in the upper portion of said reactor above said point of acetone introduction, the HCl concentration in the reaction mixture being not substantially more than 0.1 gram per 100 grams of solution, and continuously removing a mixture of trichloroacetones, predominantly 1,1,3-trichloroacetone, as product near the top of the reactor at a level a distance above the acetone inlet of at least 4 times the diameter of a circle having an area equal to the cross sectional area of said reactor.

EVERETT E. GILBERT.
CYRIL WOOLF.

References Cited in the file of this patent

UNITED STATES PATENTS

| Number | Name | Date |
|---|---|---|
| 2,116,893 | Heisel | May 10, 1938 |
| 2,199,934 | Heisel et al. | May 7, 1940 |
| 2,385,200 | Friedel | Sept. 18, 1945 |
| 2,444,661 | Maude | July 6, 1948 |

FOREIGN PATENTS

| Number | Country | Date |
|---|---|---|
| 903,220 | France | Sept. 27, 1945 |
| 606,035 | Great Britain | Aug. 5, 1948 |

OTHER REFERENCES

Groggins, "Unit Processes in Organic Synthesis," 3rd edition, pages 206 and 207, Copyright 1947 by McGraw-Hill Book Co., New York.